US008904178B2

(12) United States Patent
Wilding et al.

(10) Patent No.: US 8,904,178 B2
(45) Date of Patent: *Dec. 2, 2014

(54) SYSTEM AND METHOD FOR SECURE REMOTE ACCESS

(75) Inventors: Mark F. Wilding, Barrie (CA); Randall W. Horman, Ontario (CA)

(73) Assignee: International Business Machines Corporation, Armonk, NY (US)

(*) Notice: Subject to any disclaimer, the term of this patent is extended or adjusted under 35 U.S.C. 154(b) by 250 days.

This patent is subject to a terminal disclaimer.

(21) Appl. No.: 11/861,740

(22) Filed: Sep. 26, 2007

(65) Prior Publication Data

US 2008/0016354 A1  Jan. 17, 2008

Related U.S. Application Data

(63) Continuation of application No. 10/752,027, filed on Jan. 7, 2004, now Pat. No. 7,321,971.

(30) Foreign Application Priority Data

Aug. 26, 2003 (CA) .................................. 2438357

(51) Int. Cl.
*H04L 29/06* (2006.01)
*G06F 21/44* (2013.01)
(52) U.S. Cl.
CPC .......... *H04L 63/0428* (2013.01); *H04L 63/061* (2013.01); *G06F 21/445* (2013.01); *H04L 63/0823* (2013.01)
USPC ............... 713/171; 713/169; 713/173; 726/2; 726/6; 726/8; 726/14
(58) Field of Classification Search
USPC ........................................................ 713/169
See application file for complete search history.

(56) References Cited

U.S. PATENT DOCUMENTS

| 4,652,698 A | 3/1987 | Hale et al. |
| 5,220,603 A | 6/1993 | Parker |

(Continued)

FOREIGN PATENT DOCUMENTS

| EP | 0910003 A2 | 4/1999 |
| WO | 02017048 A3 | 2/2002 |

OTHER PUBLICATIONS

Jiang, Shan; Smith, Sean; Minami, Kazuhiro. Securing Web Servers against Insider Attack. Proceedings 17th Annual Computer Security Applications Conference, 2001. Pub. Date: 2001. Relevant pp. 265-276. http://ieeexplore.ieee.org/stamp/stamp.jsp?tp=&arnumber=991542.*

(Continued)

*Primary Examiner* — Dede Zecher
*Assistant Examiner* — Jeremiah Avery
(74) *Attorney, Agent, or Firm* — Terry Carroll; Edell, Shapiro & Finnan, LLC

(57) ABSTRACT

A method and apparatus for directing a client to establish a secure connection with a server across a public network. The server and the client exchange a Server Authentication Public Key, a Client Authentication Public Key, and a Remote Service Unique Identifier (RSUID) during a registration process. In one embodiment, the method includes the client transmitting to the server a client information package having the RSUID and a client challenge information package encrypted with the Server Authentication Public Key, the client receiving from the server a server information package having the RSUID and a server challenge information package and a portion of the received client challenge information encrypted with the Client Authentication Public Key, the client decrypting and verifying the server challenge information package with the Client Authentication Private Key, and, the client transmitting to the server an encrypted portion of the received client challenge information.

14 Claims, 3 Drawing Sheets

(56) References Cited

U.S. PATENT DOCUMENTS

| | | | |
|---|---|---|---|
| 5,535,276 A * | 7/1996 | Ganesan | 713/155 |
| 5,636,280 A * | 6/1997 | Kelly | 713/155 |
| 5,784,463 A | 7/1998 | Chen et al. | |
| 6,049,877 A | 4/2000 | White | |
| 6,058,476 A | 5/2000 | Matsuzaki et al. | |
| 6,098,056 A | 8/2000 | Rusnak et al. | |
| 6,151,676 A * | 11/2000 | Cuccia et al. | 713/176 |
| 6,230,269 B1 | 5/2001 | Spies et al. | |
| 6,233,341 B1 | 5/2001 | Riggins | |
| 6,865,681 B2 * | 3/2005 | Nuutinen | 726/14 |
| 6,954,790 B2 * | 10/2005 | Forslow | 709/227 |
| 7,024,690 B1 * | 4/2006 | Young et al. | 726/5 |
| 7,185,362 B2 * | 2/2007 | Hawkes et al. | 726/4 |
| 7,203,844 B1 * | 4/2007 | Oxford | 713/193 |
| 7,389,412 B2 * | 6/2008 | Sharma et al. | 713/153 |
| 7,587,368 B2 * | 9/2009 | Felsher | 705/65 |
| 2002/0016922 A1 * | 2/2002 | Richards et al. | 713/200 |
| 2002/0046336 A1 * | 4/2002 | Kon et al. | 713/156 |
| 2002/0087865 A1 * | 7/2002 | Eskicioglu | 713/180 |
| 2002/0090089 A1 * | 7/2002 | Branigan et al. | 380/270 |
| 2002/0194475 A1 | 12/2002 | Ishiguro et al. | |
| 2003/0021417 A1 * | 1/2003 | Vasic et al. | 380/277 |
| 2003/0028585 A1 * | 2/2003 | Yeager et al. | 709/201 |
| 2003/0093680 A1 | 5/2003 | Astley et al. | |
| 2003/0226017 A1 * | 12/2003 | Palekar et al. | 713/168 |
| 2004/0068650 A1 * | 4/2004 | Resnitzky et al. | 713/155 |

OTHER PUBLICATIONS

Ouyang, Yen-Chieh; Chang, Reay-Lin; Chiu, Ji-Hau. A New Security Key Exchange Channel for 802.11 WLANs. IEEE 37th Annual 2003 International Conference on Security Technology. Pub. Date: 2003. Relevant pp. 216-225. http://ieeexplore.ieee.org/stamp/stamp.jsp?tp=&arnumber=1297562.*

Menezes, A. et al.; "Handbook of Applied Cryptography, Passage"; Handbook of Applied Cryptography, CRC Press Series on Discrete Mathematics and it's Application, Boca Raton, FL, CRC Press, 1997; pp. 400-405.

Needham, R. M., et al.; "Using Encryption for Authentication in Large Networks of Computers"; Communications of the Association for Computing Machinery; New York; vol. 21, Dec. 1978; pp. 993-999.

Alves-Foss, J.; "Multi-Protocol Attacks and the Public Key Infrastructure"; Proceedings National Information System Security Conference; retrieved from the Internet: http://citeseer.ist.psu.edu/193952.htm; 1998; pp. 566-576.

* cited by examiner

SYSTEM AND METHOD FOR SECURE REMOTE ACCESS

CROSS-REFERENCE TO RELATED APPLICATIONS

This application is a continuation of U.S. patent application Ser. No. 10/752,027, entitled "System and Method For Secure Remote Access" and filed Jan. 7, 2004, the disclosure of which is incorporated herein by reference in its entirety.

BACKGROUND OF THE INVENTION

1. Technical Field

The present invention relates generally to a system and method for establishing a secure connection between a server and a client over a public network and specifically to a method for providing secure remote access to the client by the server.

2. Discussion of the Related Art

Referring to FIG. 1, a system for a remote software product environment is illustrated generally by numeral 100. The system 100 includes a customer system 102 and a service organization system 104. The customer system 102 includes a software product 106 and a service client 108. The service organization 104 includes a service gateway 110 and a session end point 112. The service client 108 is coupled with the service gateway 110 via a network 114. Typically, the network 114 is a public network, such as the Internet. Optionally, one or both of the service client 108 and the service gateway 110 are connected to the network 114 via a firewall 116.

Servicing a remote software product has many challenges, including transferring diagnostic data from the customer system 102 to the organization system 104, transferring software product updates from the organization system 104 to the customer system 102, and remote troubleshooting for problem diagnosis.

Transferring diagnostic data from the customer system 102 to the organization system 104 is an issue since diagnostic data often contains sensitive information. Typically, a File Transfer Protocol (FTP) is used for transferring files, even though it is inconvenient for the customers and insecure for both the customers and the service organization.

Transferring software product updates, such as fixpaks and service releases to customer system 102 from the organization system 104 is an issue since the organization system 104 providing the latest software product update should be authenticated to ensure that a malicious server is not providing malicious software instead of the expected software product update. Typically, certificates issued by a trusted third party are used for authenticating the organization system 104.

Yet further, the need for remote troubleshooting between the customer system 102 and the organization system 104 provides several issues. For example, telephone support is typically provided by many organizations. Telephone conversations can easily lead to lost information and many errors are difficult to communicate over the telephone. Alternately, some customers will allow a telnet connection into their customer system 102, which is very insecure.

Today, there is no convenient and secure facility that can alleviate these challenges. As software and hardware products become more complex, the need for convenient and a secure remote service facility is becoming more and more critical. In fact, such a solution is already desperately required. As a result, it is an object of the present invention to obviate or mitigate at least some of the above mentioned disadvantages.

SUMMARY OF THE INVENTION

In accordance with an aspect of the present invention, there is provided a method of directing a client to establish a secure connection with a server across a public network, the server and the client having exchanged a Server Authentication Public Key, a Client Authentication Public Key, and a Remote Service Unique Identifier (RSUID) during a registration process, the method including: transmitting to the server a client information package having the RSUID and a client challenge information package encrypted with the Server Authentication Public Key, receiving from the server a server information package having the RSUID and a server challenge information package and a portion of the received client challenge information encrypted with the Client Authentication Public Key, using the Client Authentication Private Key to decrypt and verify the server challenge information package, and, transmitting to the server an encrypted portion of the received client challenge information.

In accordance with another aspect of the invention, there is provided a computer program product having a computer readable medium tangibly embodying computer executable code for directing a client to establish a secure connection with a server across a public network, the server and the client having exchanged a Server Authentication Public Key, a Client Authentication Public Key, and a Remote Service Unique Identifier (RSUID) during a registration process, the computer program product including code for directing the client to: transmit to the server a client information package having the RSUID and a client challenge information package encrypted with the Server Authentication Public Key, receive from the server a server information package having the RSUID and a server challenge information package and a portion of the received client challenge information encrypted with the Client Authentication Public Key, use the Client Authentication Private Key to decrypt and verify the server challenge information package, and, transmit to the server an encrypted portion of the received client challenge information.

In accordance with yet another aspect of the invention, there is provided a method for directing a server to establish a secure connection with a client across a public network, the server and the client having exchanged a Server Authentication Public Key, a Client Authentication Public Key, and a Remote Service Unique Identifier (RSUID) during a registration process, the method including: receiving from the client a client information package having the RSUID and a client challenge information package encrypted with the Server Authentication Public Key, using the RSUID to retrieve an associated Server Authentication Private Key, using the Server Authentication Private Key to decrypt and verify the client challenge information package, and, transmitting to the client a server information package having the RSUID and a server challenge information package encrypted with the Client Authentication Public Key.

In accordance with yet another aspect of the invention, there is provided a computer program product having a computer readable medium tangibly embodying computer executable code for directing a server to establish a secure connection with a client across a public network, the server and the client having exchanged a Server Authentication Public Key, a Client Authentication Public Key, and a Remote Service Unique Identifier (RSUID) during a registration process, the computer program product including code for directing the server to: receive from the client a client information package having the RSUID and a client challenge information package encrypted with the Server Authentication Public Key, use the RSUID to retrieve an associated Server Authentication Private Key, use the Server Authentication Private Key to decrypt and verify the client challenge information package, and, transmit to the client a server information package having the RSUID and a server challenge information package encrypted with the Client Authentication Public Key.

BRIEF DESCRIPTION OF THE DRAWINGS

The embodiments of the present invention will be explained by way of the following drawings, in which.

Figure 1:
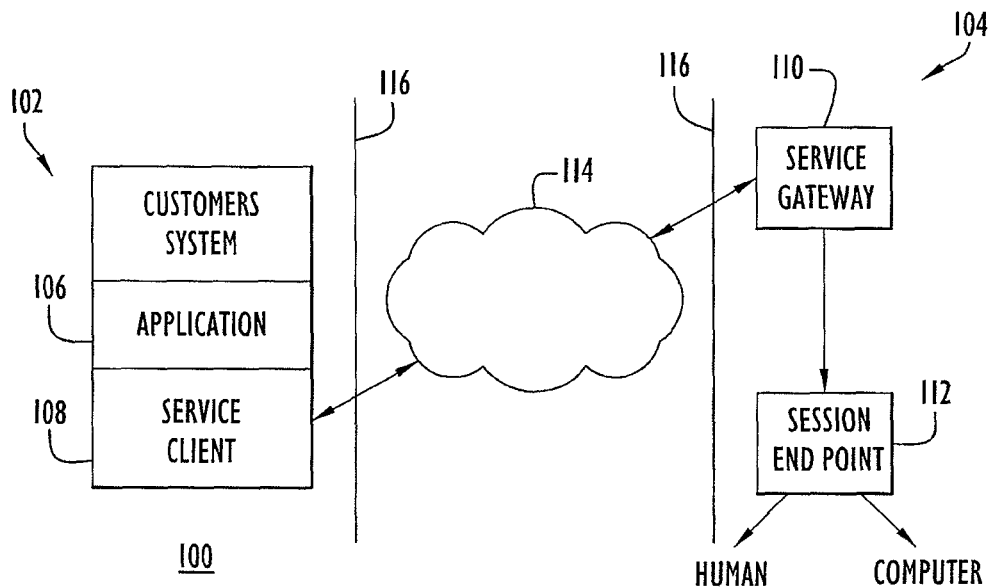
FIG. 1 is block diagram of a remote software product environment.

Similar references are used in different figures to denote similar components.

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the Operating System (OS) provides the facilities that may support the requirements of the present invention. A preferred embodiment is implemented in the C or C++ computer programming language (or other computer programming languages in conjunction with C/C++). Any limitations presented would be a result of a particular type of operating system, computer system, or computer programming language and would not be a limitation of the present invention.

As previously described, many of the problems relating to servicing a remote software product stem from security related issues associated with communicating remotely through the Internet. These problems relate to connection establishment, authentication, and privacy.

Since it is often convenient to use the Internet to communicate between the customer system 102 and the organization system 104, the present embodiment of the invention uses an Internet connection for communicating between the two systems. However, any system that allows incoming connections to the Internet is at risk for Denial of Service (DOS) attacks or being compromised by hackers. As a result, most customers do not want a server that accepts connections on the Internet that could potentially expose their system(s) to the raw Internet. Most customers feel reasonably safe, however, about initiating a connection from a client out to a server on the Internet.

Further, the customer system 102 may have access to potentially damaging functionality or sensitive data. Thus, ensuring that only authorized remote service teams at the service organization 104 have access to the customer system 102 is critical. Likewise, ensuring that only authenticated service clients 108 at the customer system 104 can connect to the service gateway 110 is equally important.

Yet further, any sensitive data that flows over the public network should be encrypted to prevent a third party from eavesdropping.

In accordance with the above requirements, the invention enables the customer system 102 to establish a connection with the organization system 104 using a public network, such as the Internet. Further, the invention allows the customer system 102 to communicate with the organization system 104 in a secure manner, while authenticating the identity of the customer system 102 to the organization system 104 and vice versa. Details of the operation of the invention are described as follows.

Without an extremely high level of security, any remote service facility will put both a service organization and its customers at risk. An initial handshake between the service clients 108 and service gateway 110 is performed to ensure a high level of security and authentication.

Figure 2:
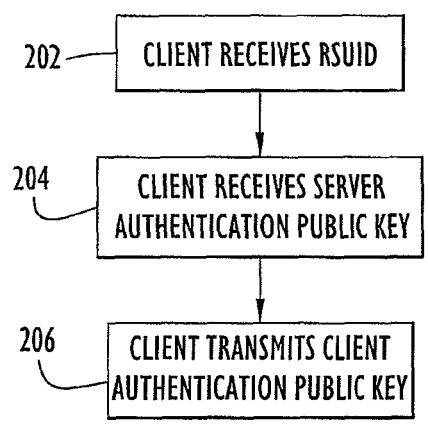
FIG. 2 is a flow chart illustrating the operation of a registration process in accordance with an embodiment of the invention.

Initially, a registration process is performed to register a customer for remote service. Referring to FIG. 2, a flow chart illustrating the operation of the registration process is shown. In step 202, the customer receives a Remote Service Unique Identifier (RSUID) that is used to differentiate the customer from other remote service customers. The RSUID need not be confidential and can be shared with the public. In step 204, the customer receives a confidential authentication public key, referred to hereinafter as the Server Authentication Public Key. The Server Authentication Public Key is the public key portion of a public/private key pair generated at the server. The Server Authentication Public Key is similar to a password in that it is used by the service client 108 for authenticating the service gateway 110. Thus, it is preferable that there is only one Server Authentication Public/Private Key pair per service client 108. In step 206, the customer generates a public/private key pair. The public key, referred to hereinafter as the Client Authentication Public Key, is provided to the server. Similar to the Server Authentication Public Key, it is preferable that the Client Authentication Public Key remain unadvertised and confidential.

The operation described above is typically performed only at registration. However, the customer may request to reregister occasionally for a variety of reasons, such as for a suspected security breach. Thus, it can be seen that the registration process described with reference to FIG. 2 will be performed relatively infrequently. As a result, this operation can be performed offline, or using encryption to transfer the data and certificates from a trusted third party to authenticate the customer and server.

Figure 3A:
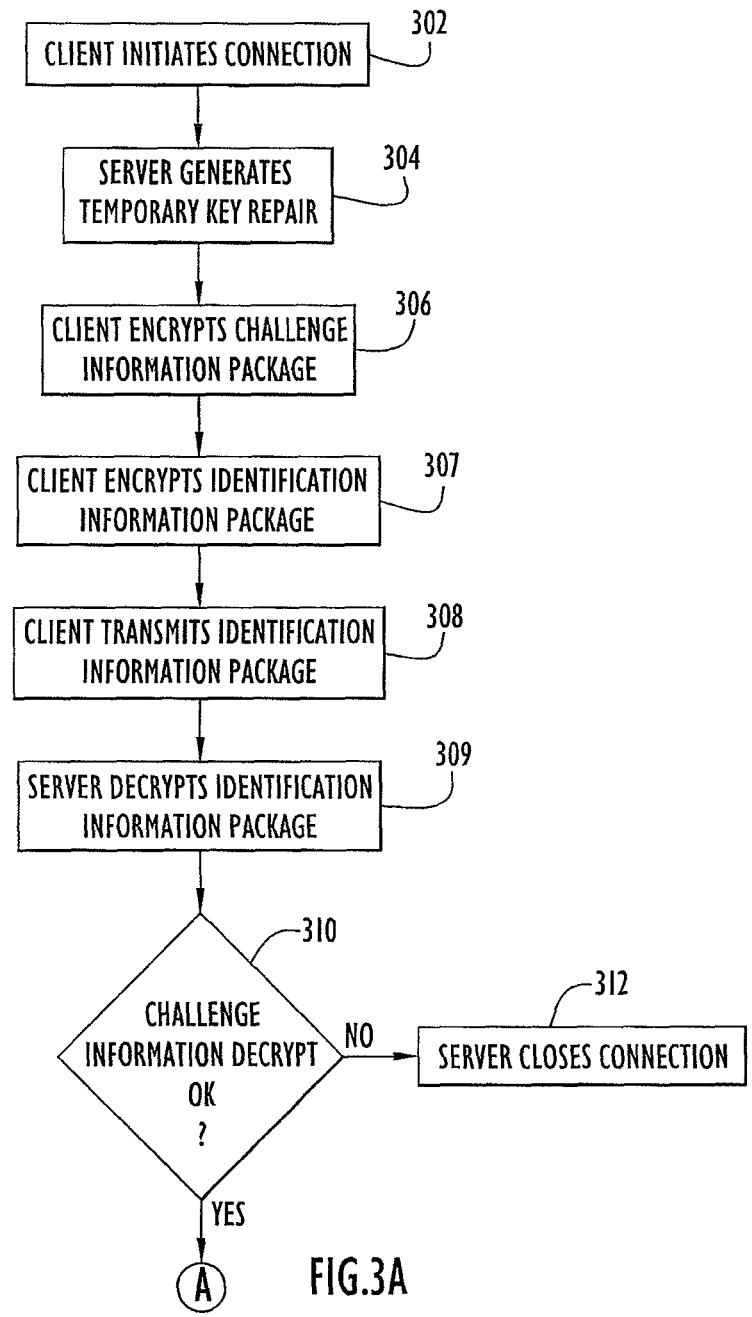
FIGS. 3A and 3B are a flow chart illustrating the operation of establishing a secure session between a server and a client in accordance with an embodiment of the invention.
Figure 3B:
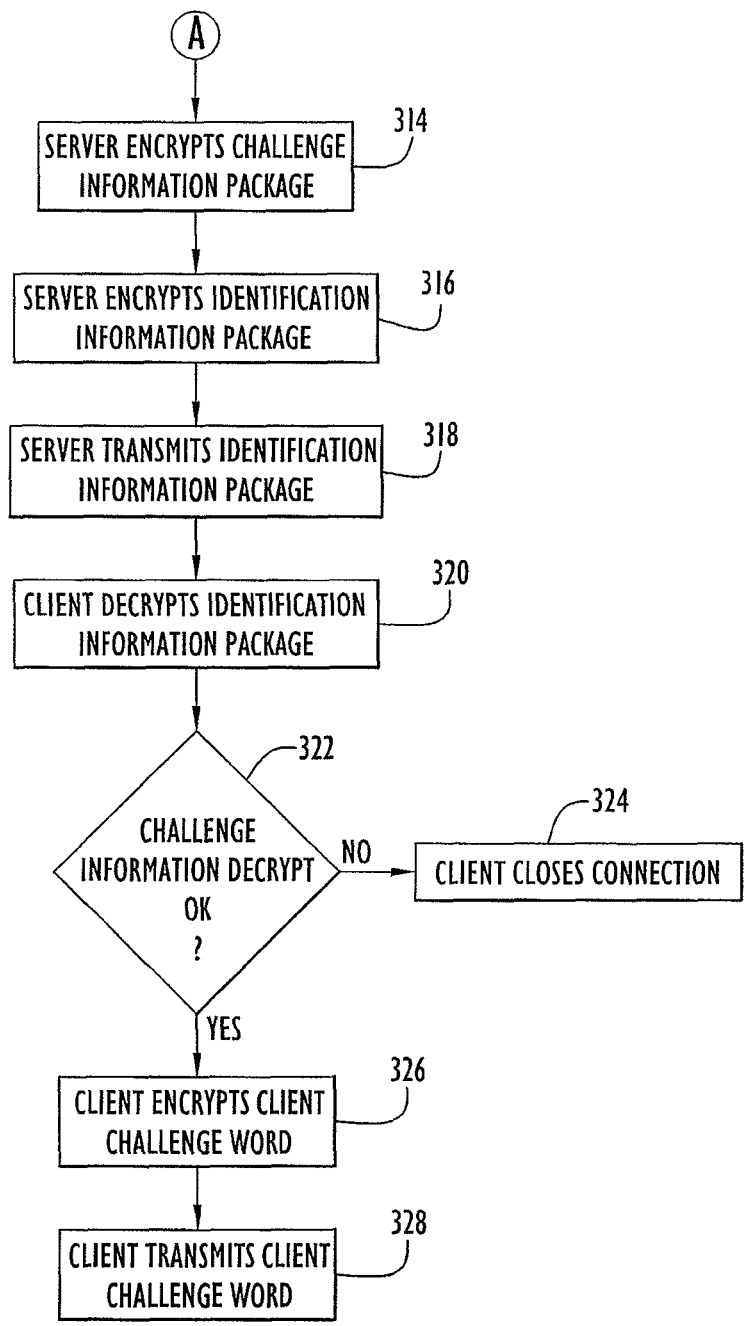

Once the customer has registered with the server, a remote service session can be established. Referring to FIGS. 3A-3B, a flow chart illustrating the steps for establishing a remote session is shown. In step 302, the customer system initiates a connection. The service client 108 establishes a Transmission Control Protocol/Internet Protocol (TCP/IP) connection, or session, to the service gateway 110. This is similar to having the customer use the telnet protocol to connect to a remote system through the Internet, although the following steps ensure a much higher level of security than a telnet connection.

In step 304, the service gateway 110 generates a Temporary Server Public/Private key pair. The Temporary Server Public Key is transmitted, unencrypted, to the service client 108 for use in initiating the session.

In step 306, the service client 104 encrypts a client challenge information package using the Server Authentication Public Key, received from the service client at step 204 of the registration operation. The client challenge information package includes the following components: a session counter identifying the number of times that a service session has been established for this particular Remote Service Unique Identifier; a Client Session Public Key that it wishes to use for this session (alternately, instead of the Client Session Public Key, a previous session ID can be included); a word length value representing the length of a Server Challenge Word, preferably including a length between 64 and 256 bytes and comprising a random number of randomly generated bytes of information, generated by the service client 108; a flag value, typically an integer, containing a set of flags, which request the type of session to establish, such as unidirectional, bidirectional, and the like; and, optionally, a session indicator for identifying the session lifetime.

In step 307, the service client 108 uses the Temporary Server Public Key to encrypt a client identification information package. Preferably, the client identification information package is independent of the software version of the software product 106. Further, the client identification information package includes the Remote Service Unique Identifier and the encrypted client challenge information package.

In step 308, the service client 108 sends the client identification information package to the service gateway 110. In step 309, the service gateway 110 uses the Temporary Server Private Key to decrypt the client identification information package. The Remote Service Unique Identifier is used to look up a corresponding Server Authentication Private Key, which is used to attempt to decrypt the client challenge information package.

In step 310, it is determined whether the service gateway 110 can decrypt the client challenge information package. That is, if the service gateway 110 can interpret and verify the client challenge information package, the service client 108 will have been authenticated and the service gateway 110 proceeds to step 314. If the service gateway 110 cannot decrypt the client challenge information it proceeds to step 312.

In step 312, the service gateway 110 sends an error message to the service client 108 and immediately closes the connection. Closing the connection immediately is important to reduce the impact of Denial of Service attacks that are TCP/IP connection establishment related.

In step 314, the service gateway 110 uses the Client Authentication Public Key, received from the service client at step 206 of the registration operation, to encrypt a server challenge information package. The server challenge information package includes the following components: a number of times that a service session has been established for this Remote Unique Service Identifier; a Server Session Public Key that the service gateway wishes to use for the duration of the session (alternately, instead of the Client Session Public Key, a previous session ID can be included); a Server Challenge Word returned to prove that the service gateway could decrypt the client challenge information package; a confirmation flag value, typically an integer, that contains a set of flags confirming the type of session to establish; a large, for example 256-byte, randomly generated Client Challenge Word and a session identification (ID); and optionally, a session indicator for confirming the session lifetime.

In step 316, the service gateway 110 uses the Client Session Public Key received from the service client 108 in the client identification information package to encrypt a server identification information package. If the client identification information package included a session ID instead of a Client Session Public Key, the Client Session Public Key associated with the session ID is used to encrypt the server identification information package. The server identification information package includes the Remote Service Unique Identifier and the server challenge information package. In step 318, the service gateway 110 sends the server identification information package to the service client 108.

In step 320, the service client 108 uses the Client Session Private Key to decrypt the server identification information package and the Client Authentication Private Key to attempt to decrypt the server challenge information package.

In step 322, it is determined whether the service client 108 can decrypt the server challenge information package. That is, if the service client 108 can interpret and verify the server challenge information package, the service gateway 110 will have been authenticated and the service client 108 proceeds to step 326. If the service client 108 cannot decrypt the server challenge information it proceeds to step 324.

In step 324, the service client 108 sends an error message to the service gateway 110 and immediately closes the connection. In step 326, the service client uses the Server Session Public Key received in the server challenge information package to encrypt the received Client Challenge Word and session ID. If the server challenge information includes a previous session ID instead of the Server Session Public Key, a Server Session Public Key associated with the previous session ID is used to encrypt the Client Challenge Word and current session ID. In step 328, the encrypted Client Challenge Word and session ID are transmitted to the service gateway 110 to prove that the service client 108 could decrypt the server challenge information package.

At this point, a remote, secure, authenticated and encrypted connection has been established between the service client 108 and the service gateway 110. The encryption for the connection is performed using the exchanged sessions keys for both sides, which were encrypted twice before they were transmitted.

Each newly established session can be uniquely identified by the Remote Service Unique Identifier and the Session ID. When a new session is created, the service gateway 110 sends a notification of the session to a default-session handling facility. The notification includes the Remote Service Unique Identifier, the Session ID, and a newly generated internal session password. The default session-handling facility may be one or more service analysts or it may be an automated service program.

A session may be transferred between session-handling facilities, where the session-handling facility is handled by a human, computer program, or other handling facility. Further, a session may be transferred between any number of session handling facilities, where the session can be handled by more than one session-handling facility at any given time. Yet further, it is possible that any type of remote service capability or facility can use the secure service session.

If the session is prematurely broken due to a network error or the like, the session ID can be used to re-establish the connection. Thus, it is preferable that both sides store the session ID, the public key of the remote side and the private key for the local side for a session. Preferably, a session can only be re-established from the customer's system.

A customer can register or un-register for remote service at any time, which provides another level of security. For customers who want even more security, they may choose to only register for remote service when a major problem occurs.

Although the method for creating a secure session described above is described as a single method, it is likely that in practice the method will be implemented as two dependent methods, running independently of each other. The first method comprises the client method, which attempts to validate and connect to a server. The second method comprises the server method, which attempts to validate and connect to a client. It is possible that an unauthenticated client may try to connect to the server, or that the client may try to connect to an unauthenticated server. However, only when an authenticated client tries to connect to an authenticated server will a secure session be established.

Though the above embodiments are described primarily with reference to a method aspect of the invention, the invention may be embodied in alternate forms. In an alternative aspect, there is provided a computer program product having a computer-readable medium tangibly embodying computer executable instructions for directing a computer system to implement any method as previously described above. It will be appreciated that the computer program product may be a floppy disk, hard disk or other medium for long term storage of the computer executable instructions.

In yet an alternative aspect, there is provided an article having a computer-readable signal-bearing medium, and having code, instructions or other means in the medium for directing a computer system to implement any method as previously described above. It will be appreciated that a supplier of the compiler may upload the article to a network (such as the Internet) and users may download the article via the network to their respective computer systems.

It will be appreciated that variations of some elements are possible to adapt the invention for specific conditions or functions. The concepts of the present invention can be further extended to a variety of other applications that are clearly within the scope of this invention. Having thus described the present invention with respect to a preferred embodiment as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method of directing a client to establish a secure connection with a server providing remote customer services across a network, the method comprising:
   (a) exchanging a server authentication public key, a client authentication public key, and a remote service unique identifier between the server and the client during a registration process, and transmitting from the client to the server a client information package encrypted with a temporary server public key provided by the server in response to initiating a connection between the client and the server, wherein the client information package includes the unique identifier and a client challenge information package encrypted with the server authentication public key to authenticate the client to the server and indicating a client session public key, wherein the unique identifier uniquely identifies a remote service customer, and decryption of the client information package by a temporary server private key and the client challenge information package by the server with a server authentication private key authenticates the client, and wherein said server authentication private key is associated with the server authentication public key and is retrieved based on the unique identifier serving as an index;
   (b) receiving at the client from the server a server information package encrypted with the client session public key indicated in the client information package and having the unique identifier and a server challenge information package encrypted with the client authentication public key and indicating a server session public key;
   (c) decrypting the received server information package utilizing a client session private key and decrypting and verifying the server challenge information package with a client authentication private key associated with the client authentication public key to authenticate the server, wherein decryption of the server challenge information package by the client with the client authentication private key authenticates the server; and
   (d) transmitting from the client to the server portion of the decrypted server challenge information utilizing the server session public key indicated in the received server information package to indicate decryption of the server challenge information and authenticity of the server and facilitate access by the client to the remote customer services.

2. The method of claim 1, wherein step (a) further includes:
   (a.1) transmitting the client challenge information package including a client session public key.

3. The method of claim 1, wherein step (a) further includes:
   (a.1) transmitting the client challenge information package including a previous session ID to enable the server to select a client session public key associated with the previous session ID.

4. A computer program product having a computer readable memory device tangibly embodying computer program logic for directing a client to establish a secure connection with a server providing remote customer services across a network, said computer program product comprising:
   a registration module to exchange a server authentication public key, a client authentication public key, and a remote service unique identifier between the server and the client during a registration process;
   an initiation module to transmit from the client to the server a client information package encrypted with a temporary server public key provided by the server in response to initiation of a connection between the client and the server, wherein the client information package includes the unique identifier and a client challenge information package encrypted with the server authentication public key to authenticate the client to the server and indicating a client session public key, wherein the unique identifier uniquely identifies a remote service customer, and decryption of the client information package by a temporary server private key and the client challenge information package by the server with a server authentication private key authenticates the client, and wherein said server authentication private key is associated with the server authentication public key and is retrieved based on the unique identifier serving as an index;
   a reception module to receive at the client from the server a server information package encrypted with the client session public key indicated in the client information package having the unique identifier and a server challenge information package encrypted with the client authentication public key and indicating a server session public key;
   a decryption module to decrypt the received server information package utilizing a client session private key and to decrypt and verify the server challenge information package with a client authentication private key associated with the client authentication public key to authenticate the server, wherein decryption of the server challenge information package by the client with the client authentication private key authenticates the server; and
   a response module to transmit from the client to the server a portion of the decrypted received server challenge information encrypted utilizing the server session public key indicated in the received server information package to indicate decryption of the server challenge information and authenticity of the server and to facilitate access by the client to the remote customer services.

5. The computer program product of claim 4, wherein the initiation module includes:
 a session key module to place a client session public key within the client challenge information package.

6. The computer program product of claim 4, wherein the initiation module includes:
 a session tracking module to place a previous session ID within the client challenge information package to enable the server to select a client session public key associated with the previous session ID.

7. A method for directing a server providing remote customer services to establish a secure connection with a client across a network, the method comprising:
 (a) exchanging a server authentication public key, a client authentication public key, and a remote service unique identifier between the server and the client during a registration process, and receiving at the server from the client a client information package encrypted with a temporary server public key provided by the server in response to initiation of a connection between the client and the server, wherein the client information package includes the unique identifier and a client challenge information package encrypted with the server authentication public key to authenticate the client to the server and indicating a client session public key, wherein the unique identifier uniquely identifies a remote service customer;
 (b) decrypting the received client information package utilizing a temporary server private key and retrieving a server authentication private key associated with the server authentication public key utilizing the received unique identifier as an index;
 (c) decrypting and verifying the client challenge information package with the server authentication private key, wherein decryption of the client Challenge information package by the server with the server authentication private key authenticates the client;
 (d) transmitting from the server to the client a server information package encrypted with the client session public key indicated in the received client information package and including the unique identifier and a server challenge information package encrypted with the client authentication public key to authenticate the server to the client and indicating a server session public key, wherein decryption by the client of the server information package utilizing a client session private key and the server challenge information package utilizing a client authentication private key associated with the client authentication public key authenticates the server; and
 (e) enabling access by the client to the remote customer services in accordance with an appropriate response from the client indicating decryption of the server challenge information and authenticity of the server, wherein the appropriate response includes a portion of the decrypted server challenge information encrypted utilizing the server session public key indicated in the server information package.

8. The method of claim 7, wherein step (d) further includes:
 (d.1) transmitting the server challenge information package including a server session public key.

9. The method of claim 7, wherein step (d) further includes:
 (d.1) transmitting the server challenge information package including a previous session ID that enables the client to select a server session public key associated with the previous session ID.

10. A computer program product having a computer readable memory device tangibly embodying computer program logic for directing a server providing remote customer services to establish a secure connection with a client across a network, said computer program product comprising:
 a registration module to exchange a server authentication public key, a client authentication public key, and a remote service unique identifier between the server and the client during a registration process;
 a reception module at the server to receive from the client a client information package encrypted with a temporary server public key provided by the server in response to initiation of a connection between the client and the server, wherein the client information package includes the unique identifier and a client challenge information package encrypted with the server authentication public key to authenticate the client to the server and indicating a client session public key, wherein the unique identifier uniquely identifies a remote service customer;
 a decryption module to decrypt the received client information package utilizing a temporary server private key;
 an index module at the server to retrieve a server authentication private key associated with the server authentication public key utilizing the received unique identifier as an index;
 a validation module at the server to decrypt and verify the client challenge information package with the server authentication private key, wherein decryption of the client challenge information package by the server with the server authentication private key authenticates the client;
 a transmission module at the server to transmit to the client a server information package encrypted with the client session public key indicated in the received client information package and including the unique identifier and a server challenge information package encrypted with the client authentication public key to authenticate the server to the client and indicating a server session public key, wherein decryption by the client of the server information package utilizing a client session private key and the server challenge information package utilizing a client authentication private key associated with the client authentication public key authenticates the server; and
 an access module at the server to enable access by the client to the remote customer services in accordance with an appropriate response from the client indicating decryption of the server challenge information and authenticity of the server, wherein the appropriate response includes a portion of the decrypted server challenge information encrypted utilizing the server session public key indicated in the server information package.

11. The computer program product of claim 10, wherein the transmission module includes:
 a session module to place a server session public key within the server challenge information package.

12. The computer program product of claim 10, wherein the transmission module includes:
 a session tracking module to place a previous session ID within the server challenge information package that enables the client to select a server session public key associated with the previous session ID.

13. A system to establish a secure connection between a server computer system providing remote customer services and a client across a network, the system comprising:
 a server computer system in communication with a client via a network;
 a registration module to exchange a server authentication public key, a client authentication public key, and a remote service unique identifier between the server computer system and the client during a registration process;

a reception module at the server computer system to receive from the client a client information package encrypted with a temporary server public key provided by the server computer system in response to initiation of a connection between the client and the server computer system, wherein the client information package includes the unique identifier and a client challenge information package encrypted with the server authentication public key to authenticate the client to the server computer system and indicating a client session public key, wherein the unique identifier uniquely identifies a remote service customer;

a decryption module to decrypt the received client information package utilizing a temporary server private key;

an index module at the server computer system to retrieve a server authentication private key associated with the server authentication public key utilizing the received unique identifier as an index;

a validation module at the server computer system to decrypt and verify the client challenge information package with the server authentication private key, wherein decryption of the client challenge information package by the server computer system with the server authentication private key authenticates the client;

a transmission module at the server computer system to transmit to the client a server information package encrypted with the client session public key indicated in the received client information package and including the unique identifier and a server challenge information package encrypted with the client authentication public key to authenticate the server computer system to the client and indicating a server session public key, wherein decryption by the client of the server information package utilizing a client session private key and the server challenge information package utilizing a client authentication private key associated with the client authentication public key authenticates the server computer system; and an access module at the server computer system to enable access by the client to the remote customer services in accordance with an appropriate response from the client indicating decryption of the server challenge information and authenticity of the server computer system, wherein the appropriate response includes a portion of the decrypted server challenge information encrypted utilizing the server session public key indicated in the server information package.

14. The system of claim 13, further including:

an initiation module at said client to transmit to the server computer system the client information package including the unique identifier and the client challenge information package encrypted with the server authentication public key;

a reception module at the client to receive from the server computer system the server information package having the unique identifier and the server challenge information package encrypted with the client authentication public key;

a client decryption module at the client to decrypt and verify the server challenge information package with the client authentication private key; and a response module at the client to transmit to the server computer system a portion of the decrypted server challenge information encrypted utilizing the server session public key indicated in the server information package to facilitate access by the client to the remote customer services.

\* \* \* \* \*